(12) United States Patent
Lyons et al.

(10) Patent No.: US 12,328,092 B2
(45) Date of Patent: Jun. 10, 2025

(54) DEVICES AND METHODS FOR MOUNTING SOLAR PANELS

(71) Applicant: Mark Jack Lyons, Bondi Junction (AU)

(72) Inventors: Mark Jack Lyons, Bondi Junction (AU); Geoffrey Hyman Louis Lyons, Bondi Junction (AU)

(73) Assignee: Mark Jack Lyons, Bondi Junction (AU)

( * ) Notice: Subject to any disclaimer, the term of this patent is extended or adjusted under 35 U.S.C. 154(b) by 0 days.

(21) Appl. No.: 18/444,150

(22) Filed: Feb. 16, 2024

(65) Prior Publication Data

US 2025/0055405 A1  Feb. 13, 2025

(30) Foreign Application Priority Data

Aug. 8, 2023 (AU) ................................ 2023902503
Nov. 14, 2023 (AU) ................................ 2023266245

(51) Int. Cl.
| | |
|---|---|
| *H02S 20/00* | (2014.01) |
| *F16B 2/12* | (2006.01) |
| *F24S 25/00* | (2018.01) |
| *F24S 25/35* | (2018.01) |
| *F24S 25/60* | (2018.01) |
| *F24S 25/634* | (2018.01) |
| *H02S 20/23* | (2014.01) |

(52) U.S. Cl.
CPC ............... *H02S 20/00* (2013.01); *F16B 2/12* (2013.01); *F24S 2025/014* (2018.05); *F24S 2025/022* (2018.05); *F24S 25/35* (2018.05); *F24S 2025/6003* (2018.05); *F24S 25/634* (2018.05); *H02S 20/23* (2014.12)

(58) Field of Classification Search
CPC ......... H02S 20/00; H02S 20/23; F24S 25/33; F24S 25/636; F24S 25/35; F24S 25/634; F24S 2025/6003; F24S 2025/014; F24S 2025/022; F16B 2/12; F16B 5/06; H01L 31/04; E04D 13/18
See application file for complete search history.

(56) References Cited

U.S. PATENT DOCUMENTS

| | | | |
|---|---|---|---|
| 5,274,978 A * | 1/1994 | Perkonigg | F24S 25/61 52/509 |
| 2011/0073733 A1* | 3/2011 | Hartelius | F24S 25/12 248/316.7 |
| 2012/0112034 A1* | 5/2012 | Harris | H02G 3/0437 248/535 |

(Continued)

FOREIGN PATENT DOCUMENTS

| | | | | |
|---|---|---|---|---|
| CN | 101614058 B | 5/2011 | | |
| DE | 102005061709 A1 * | 3/2007 | ............... | F24J 2/045 |

(Continued)

*Primary Examiner* — Tan Le
(74) *Attorney, Agent, or Firm* — Finnegan, Henderson, Farabow, Garrett & Dunner, LLP

(57) ABSTRACT

Disclosed are devices and methods for mounting solar panels to a surface. A device for mounting solar panels to a surface comprises a frame configured to be secured to the surface. The frame comprises a retainer comprising a first jaw and a second jaw defining a channel between them for receiving a solar panel, wherein the first jaw adjoins the surface when the frame is secured to the surface.

16 Claims, 9 Drawing Sheets

(56) References Cited

U.S. PATENT DOCUMENTS

| | | |
|---|---|---|
| 2013/0220395 A1 | 8/2013 | Babineau, Jr. |
| 2015/0244308 A1 | 8/2015 | Patton et al. |
| 2016/0111996 A1* | 4/2016 | Stephan .................. H02S 20/23 248/316.6 |
| 2016/0173024 A1 | 6/2016 | Itou et al. |
| 2016/0268958 A1* | 9/2016 | Wildes .................... H02S 20/23 |
| 2017/0237386 A1 | 8/2017 | Stephan et al. |

FOREIGN PATENT DOCUMENTS

| | | | |
|---|---|---|---|
| DE | 20 2010 008 139 U1 | 10/2010 | |
| DE | 20 2013 004 982 U1 | 6/2014 | |
| FR | 2 957 405 A1 | 9/2011 | |
| WO | WO-2010003594 A2 * | 1/2010 | ............. E04D 3/366 |

* cited by examiner

FIGURE 12
FIGURE 13
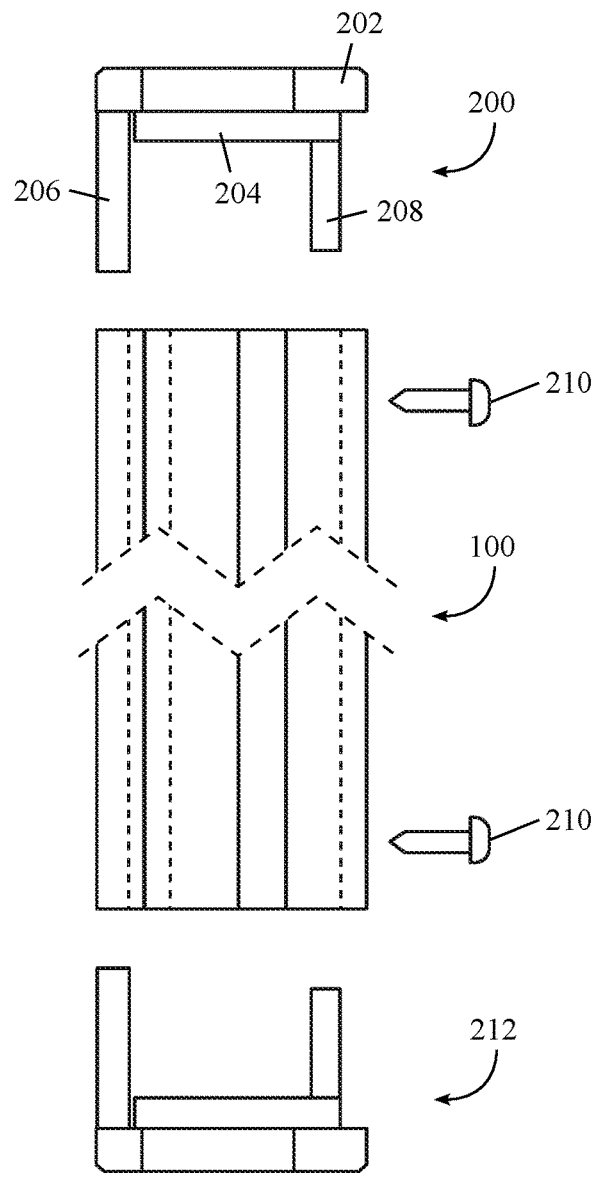
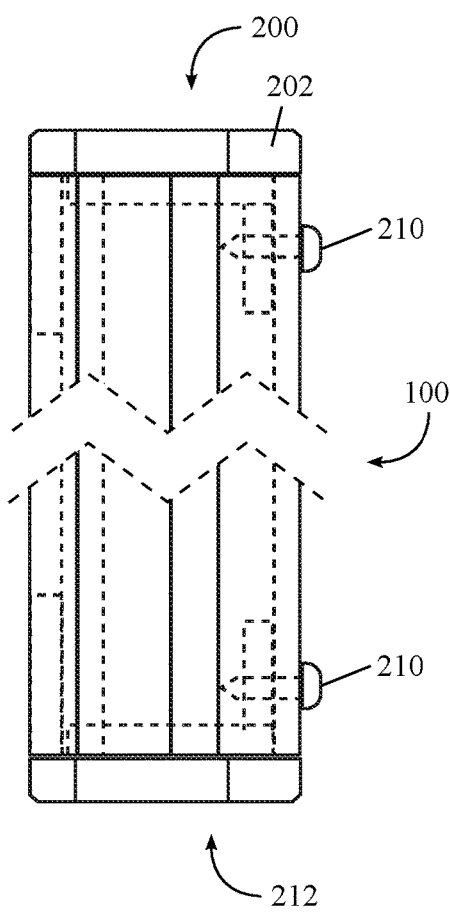

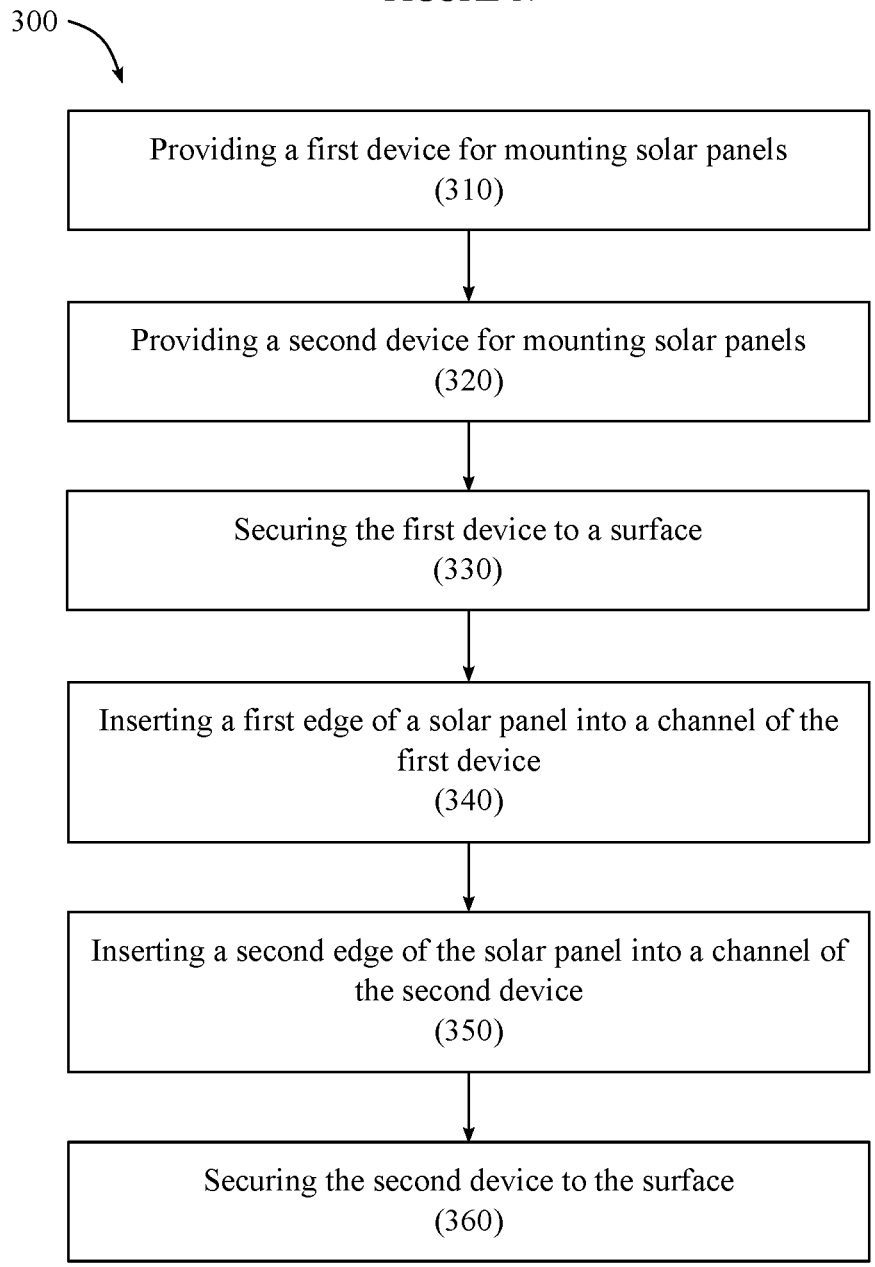

DEVICES AND METHODS FOR MOUNTING SOLAR PANELS

TECHNICAL FIELD

The present invention relates to devices and methods for mounting solar panels to a surface.

BACKGROUND

Solar panels that are installed on buildings are normally installed on horizontal or semi-horizontal surfaces, usually on the building's rooftop. In certain cases, however, it is desirable to install solar panels on vertical surfaces such as walls, especially in high-rise buildings, where the availability of vertical space greatly exceeds that of horizontal space, to augment the number of solar panels able to be installed.

Many solar panel mounting rails are not suited to being installed on a vertical surface because they leave an excessive gap between the rear side of the solar panel and the vertical surface. This gap makes the solar panel more susceptible to weather damage, and it leaves the electrical wiring at the back of the solar panel exposed, increasing the risk of electrical fires.

It is desired to address or ameliorate one or more disadvantages or limitations associated with the prior art, or to at least provide a useful alternative.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

SUMMARY

According to an example aspect, there is provided a device for mounting solar panels to a surface. The device comprises a frame configured to be secured to the surface, the frame comprising a retainer comprising a first jaw and a second jaw defining a channel between them for receiving a solar panel, wherein the first jaw adjoins the surface when the frame is secured to the surface.

In some examples, the first jaw is an extremity of the frame on a rear side of the frame, the rear side being the side of the frame facing the surface when the frame is secured to the surface. In some examples, at least one of the first jaw and the second jaw comprises a resistive portion for resisting a movement of the solar panel placed in the channel.

In some examples, the frame comprises a support and a wall rising from the support, wherein the support is configured to be secured to the surface, and wherein the first jaw and the second jaw extend from the wall. In some examples, the first jaw is level with at least a portion of the support at a base of the wall. In some examples, the support comprises a recess on a rear side of the support, the rear side of the support being the side facing the surface when the frame is secured to the surface. In some examples, the support comprises a first flange, a second flange, and a bridge attached between the first flange and the second flange, wherein the recess is defined by the first flange, the second flange, and the bridge. In some examples, the support comprises one or more apertures for the passage of fasteners for securing the frame to the surface.

In some examples, the wall is a first wall, and the frame further comprises a second wall extending alongside the first wall and a compartment between the first wall and the second wall. In some examples, the first wall comprises one or more apertures opening into the compartment for the passage of electrical conductors.

In some examples, the device further comprises a front cover configured to be secured to the frame for closing a front side of the compartment. In some examples, the first wall and the second wall each comprise a ledge extending from a free end of the respective first wall and second wall, and wherein in a closed position the front cover is secured to the frame by engaging the ledge of the first wall and the ledge of the second wall. In some examples, the front cover comprises a first catch portion and a second catch portion on opposite sides of the front cover, wherein the first catch portion and the second catch portion each comprise a groove configured to receive the ledge of the first wall and the ledge of the second wall, respectively, when the front cover is in the closed position. In some examples, the ledge of one of the first wall and the second wall is a straight ledge, and wherein the ledge of the other of the first wall and the second wall is a hooked ledge.

In some examples, the device further comprises an end cover configured to be secured to the frame for closing an end side of the compartment. In some examples, the end cover comprises a plate and a ridge attached to the plate and configured to mate with an end opening of the compartment defined by the first wall, the second wall, and the support. In some examples, the end cover further comprises a first tab and a second tab projecting from opposite sides of the plate, the first tab being configured to mate with a slot defined between the support and the surface when the frame is secured to the surface, and the second tab being configured to abut a compartment-facing surface of the front cover when the front cover and the end cover are both in the closed position.

In some examples, the frame comprises a further retainer comprising a first jaw and a second jaw extending from the second wall and defining a further channel between them for receiving a further solar panel, wherein the first jaw of the further retainer adjoins the surface when the frame is secured to the surface.

In some examples, the device further comprises a stopper configured to be securely fitted into the channel. In some examples, the stopper comprises a stem and a head attached to an end of the stem. In some examples, the stem is hollow. In some examples, two opposite outer surfaces of the stem each comprise a resistive portion.

According to another example aspect, there is provided a method for mounting a solar panel to a surface. The method comprises: providing a first device and a second device for mounting solar panels to a surface as described herein; securing the first device to the surface; inserting a first edge of the solar panel into the channel of the first device; inserting a second edge of the solar panel into the channel of the second device; and securing the second device to the surface.

In some examples, the method further comprises inserting two stoppers into the channel of the first device at both ends of the first edge of the solar panel, and inserting two stoppers into the channel of the second device at both ends of the second edge of the solar panel. In some examples, the surface is a non-horizontal surface. In some examples, the surface is a vertical surface.

BRIEF DESCRIPTION OF THE DRAWINGS

Some embodiments of the present invention are described below, by way of example only, with reference to the accompanying drawings, in which:

FIG. 12 shows a side view of the device of FIG. 1 and example top and bottom end covers in an open position;

FIG. 13 shows a side view of the device of FIG. 1 and example top and bottom end covers in a closed position;

FIG. 17 shows a flowchart of an example method for mounting solar panels.

DETAILED DESCRIPTION

Figure 1:
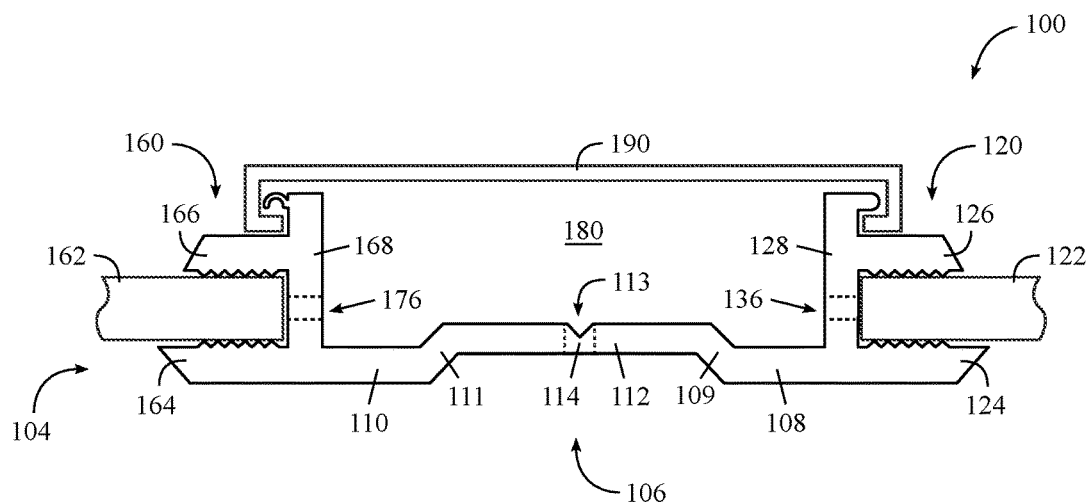
FIG. 1 shows an end view of an example device for mounting solar panels.

Embodiments of the invention provide devices or assemblies for mounting or installing solar panels to a surface. The devices comprise a frame configured to be secured to the surface. The frame comprises one or more retainers or holders, each retainer or holder comprising a first jaw and a second jaw defining a channel or socket between them for receiving a solar panel. The first jaw of each of the one or more retainers or holders adjoins the surface when the frame is secured to the surface.

In some examples, the first jaw adjoins the surface by being in contact with or abutting the surface. In other examples, the first jaw adjoins the surface by being close to, but without being in contact with, the surface. In some examples, when the frame is secured to the surface and the first jaw is not in contact with the surface, a gap between the first jaw and the surface is not greater than a thickness of the first jaw.

In this way, when the device is secured to the surface, a solar panel inserted in the channel is in close proximity to the surface, being separated from the surface by as little as the thickness of the first jaw, thus reducing a gap between the surface and the solar panel mounted or installed thereto, to enable or accommodate the installation of solar panels to non-horizontal surfaces including vertical surfaces.

Embodiments of the invention further provide systems for mounting solar panels to a surface. The systems comprise two or more of the aforementioned devices, each device being configured to support a part, such a side, of a solar panel. Two such devices secured to the surface and spaced apart from each other may cooperate in supporting a solar panel between them.

The surface may be a vertical surface, such as a wall, a horizontal surface, such as a flat roof, or a sloped surface, such as a sloped roof. The surface may be flat or substantially flat with local variations in the plane of the surface due to imperfections in the texture or finish of the surface. The surface may be a surface of any structure, such as a building.

The dimensions of the devices and of any of their members or parts may be chosen or changed to accommodate solar panels, electrical equipment, and surfaces with different characteristics and sizes. For example, the dimensions of and the spacing between the jaws may be designed to fit any size or type of solar panel and to provide any tightness of fit desired. In some examples, the length of the device (and of the jaws) substantially corresponds to the length of a solar panel, so that one device supports a whole side of one solar panel.

FIGS. 1 to 5 show an example device 100 for mounting solar panels to a surface 102.

Device 100 comprises a frame or body 104 configured to be secured or fixed to surface 102. Frame 104 comprises a support or base 106 comprising a first flange or plate 108, a second flange or plate 110 spaced apart from flange 108, and a bridge or platform 112 between flanges 108 and 110. A first riser or abutment 109 connects an end of bridge 112 to flange 108, and a second riser or abutment 111 connects the other end of bridge 112 to flange 110. Risers 109 and 111 are sloped or inclined relative to the main surfaces of flanges 108 and 110 and bridge 112, which are all parallel to each other. Bridge 112 is elevated or at a different level than flanges 108 and 110, forming a recess or space, defined between bridge 112 and flanges 108 and 110, on a rear side of support 106, which is the side facing surface 102 when frame 104 is secured to surface 102. The recess has the shape of a trapezoidal prism.

Figure 3:
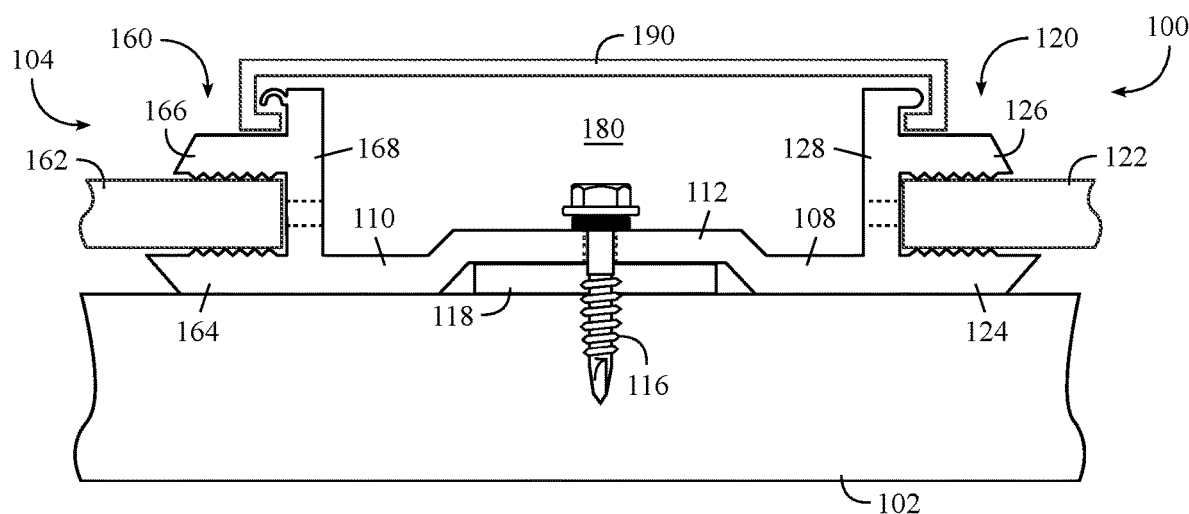
FIG. 3 shows a sectional end view of the device of FIG. 1 secured to a surface.

Support 106 comprises one or more apertures or holes 114 for the passage of fasteners 116, such as screws or bolts, to secure support 106, and therefore frame 104, to surface 102. Apertures 114 are located along the middle of bridge 112 and may be distributed throughout its length. Bridge 112 also comprises a groove or channel 113, with a V-shaped cross section, located along the middle of bridge 112 and extending throughout its length. As shown in FIG. 3, a mounting plate 118 having corresponding apertures may be situated within the recess in support 106, between support 106 and surface 102. Mounting plate 118 may increase the strength and durability of the connection of frame 104 to surface 102. The design of support 106 provides space for mounting plate 118 while still allowing the portion of frame 104 that supports solar panels to adjoin surface 102 without or with a minimal gap.

Figure 2:
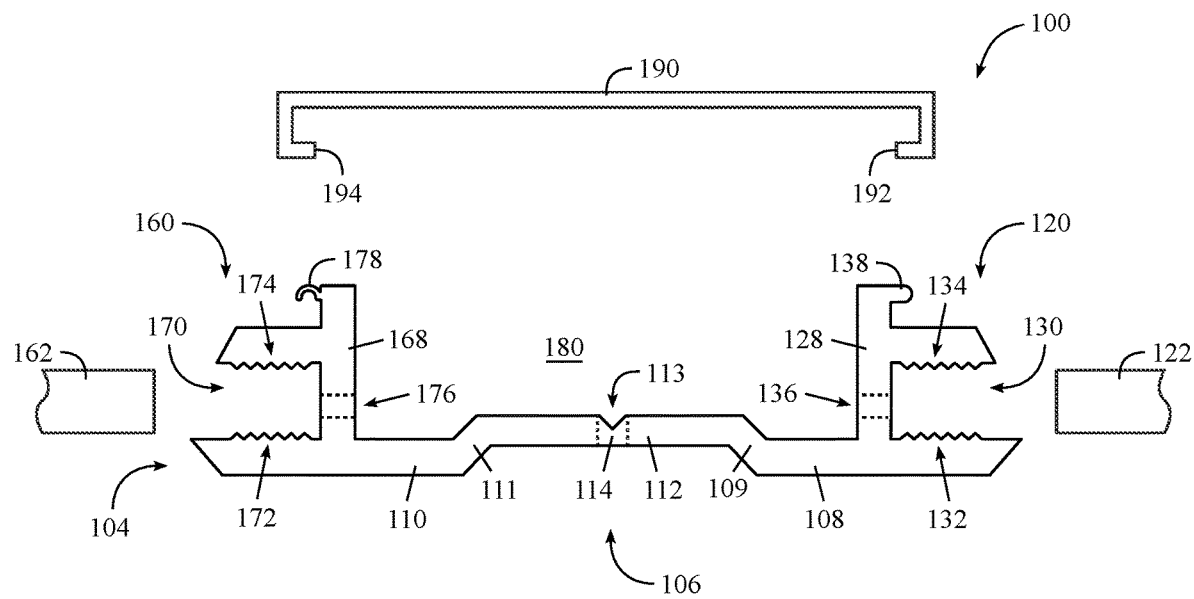
FIG. 2 shows an exploded view of FIG. 1.

Frame 104 further comprises a first retainer or bifurcated member 120 and a second retainer or bifurcated member 160 configured to hold or support solar panels 122 and 162, respectively, as shown in FIGS. 1 to 3. Retainers 120 and 160 are attached to opposite sides of support 106. Retainer 120 comprises a pair of jaws, projections, or ribs 124 and 126 extending or protruding from a wall 128 of frame 104 in a direction perpendicular to a main surface of wall 128, pointing away from support 120. Wall 128 rises from an end of flange 108 in a direction perpendicular to a main surface of flange 108. Retainer 160 also comprises a pair of jaws 164 and 166, extending from wall 168 of frame 104, rising from an end of flange 110. Jaws 164 and 166 are arranged like jaws 124 and 126 but point in an opposite direction.

Jaws 124 and 126 are spaced apart, forming a channel, socket, or mouth 130 between themselves for receiving solar panel 122. It is to be understood that the portion of solar panel 122 received between jaws 124 and 126 may be a frame or a supporting structure of solar panel 122. Opposing surfaces of jaws 124 and 126 (i.e. the surfaces facing each other and directed towards solar panel 122 when it is inserted between them) are substantially parallel. The spacing between jaws 124 and 126 substantially corresponds to the thickness of solar panel 122, so that jaws 124 and 126 are both in contact with solar panel 122 inserted between them to provide a tight and secure fit. Jaws 124 and 126 may be sized so that only part of solar panel 122, such as an outer edge, is received into channel 130, while a majority of a main surface of solar panel 122 remains exposed for the reception of sunlight. Jaws 164 and 166 are likewise arranged, forming a channel, socket, or mouth 170 between themselves for receiving solar panel 162.

Jaws 124 and 126 comprise resistive or abrasive portions or members 132 and 134, respectively, such as a series of teeth or corrugations, for assisting the securement of solar panel 122 within channel 130. In other examples, resistive portions 132 and 134 comprise rubber elements, abrasive coatings, or any other means for resisting a displacement of solar panel 122 within channel 130. In other examples, only one or neither of jaws 124 and 126 comprises a resistive portion. Resistive portions 132 and 134 are disposed within channel 130 on the opposing surfaces of jaws 124 and 126, respectively, and extend from a blind end of retainer 120 (i.e. the end proximate wall 128), covering a majority of the opposing surfaces, the remainder of which, near the open end of retainer 120, are smooth and devoid of resistive portions. In other examples, resistive portions 132 and 134 cover any portion of the opposing surfaces. Jaws 164 and 166 also comprise resistive portions 172 and 174, arranged like resistive portions 132 and 134.

The arrangement of retainers 120 and 160 is such that, when frame 104 is secured to surface 102, a jaw of each retainer, being jaw 124 and jaw 164, adjoins surface 102, as shown in FIG. 3. In the example illustrated, a rear or outward-facing surface of each of jaws 124 and 164 is adjacent to and in contact with surface 102. In other examples, the rear or outward-facing surface of jaws 124 and 164 adjoins surface 102 without being in contact with it. Portions of support 106 at or near the bases of walls 128 and 168, namely flanges 108 and 110, are level with jaws 124 and 164 and also adjoin surface 102. Jaws 124 and 164 (and flanges 108 and 110) therefore form or define an extremity on a rear side of frame 104, which is the side facing surface 102 when device 104 is secured to surface 102, defining the outermost portion of frame 104 on its rear side.

Frame 104 further comprises a compartment or storage volume 180 for storing items such as electrical equipment and wiring operatively connected to solar panels 122 and 162. Compartment 180 is formed between and defined by wall 128, wall 168, and support 106, extending along the entire length of retainers 120 and 160. Walls 128 and 168 each comprise one or more apertures 136 and 176, respectively, through which compartment 180 communicates with or is accessible from channels 130 and 170, for the passage of electrical conductors, such as wires and cables, so that solar panels 122 and 162 can be electrically connected to electrical equipment stored in compartment 180 or to each other without the electrical conductors being exposed from device 100, improving the safety and aesthetic appearance of the mounting arrangement.

Equipment that may be stored in compartment 180 includes, but is not limited to, inverters such as microinverters for converting DC power produced by solar panels 122 and 162 to AC power, electricity storage devices such as lithium-ion batteries, lights such as light-emitting diodes, and electricity metres such as smart meters for monitoring energy consumption.

Device 100 further comprises a front or first cover or lid 190 securable to frame 104 for closing a front or main side of compartment 180 (i.e. the side of compartment 180 facing away from surface 102). Cover 190 comprises a first catch portion 192 and a second catch portion 194 on opposite sides of cover 190, each formed by bending or folding cover 190 onto itself along a longitudinal axis of cover 190, so that each of the edges of cover 190 has an inturned edge defining a groove or gap, with a substantially C-shaped cross-section.

When cover 190 is in a closed position, catch portions 192 and 194 are configured to receive within their grooves protrusions or stops provided on walls 128 and 168, and to engage said protrusions or stops to secure cover 190 to frame 104. The protrusion on wall 128 comprises a straight ledge 138 extending from a top or free end of wall 128, spaced apart from jaw 126. The protrusion on wall 168 comprises a hooked ledge 178 extending from a top or free end of wall 168, spaced apart from jaw 166. Hooked ledge 178 has a substantially U-shaped cross section and is oriented such that a concave surface of hooked ledge 178 faces jaw 166.

The shape and configuration of ledges 138 and 178 may facilitate the process of securing cover 190 to frame 104 when cover 190 cannot be made to slide lengthwise onto frame 104 due to, for example, its excessive length or insufficient space at either end of device 100. In such cases, cover 190 is secured to frame 104 by sequentially fitting catch portions 192 and 194 on respective ledges 138 and 178. In some examples, this process includes fitting catch portion 194 on hooked ledge 178 so that hooked ledge 178 is situated or confined within the groove defined by catch portion 194; and then pushing or forcing the side of cover 190 on which catch portion 192 is located (i.e. the side opposite to the side of catch portion 194) onto and over straight ledge 138, causing catch portion 192 to clip or snap-fit onto straight ledge 138. Hooked ledge 178 is configured to catch the inturned edge of catch portion 194 as cover 190 is pivoted to move catch portion 192 towards straight ledge 138, holding on to that side of cover 190 until the other side is secured to frame 104.

The C-shaped cross section of catch portions 192 and 194 may allow cover 190 to provide a watertight seal or closure on the front side of compartment 180, in some examples, without the need for gaskets.

Cover 190 is a removable cover, being able to be fully detached and separated from frame 104. In other examples, cover 190 can be opened without being fully removed and separated, such as by being connected through a hinged connection to one of sidewalls 128 and 168.

Frame 104 is a unitary frame, formed from a single piece or element. In other examples, frame 104 is a composite frame, formed from multiple pieces or elements (e.g. support 106 and retainers 120 and 160 may be separate pieces connected together). In some examples, frame 104 and cover 190 are made of aluminium, such as extruded aluminium, or of polycarbonate material, both of which are typically lighter than steel. In other examples, frame 104 and cover 190 are made of any one or more materials.

The configuration of support 106 may add additional core strength to device 100, allowing device 100 to support heavier solar panels, especially in a vertical orientation. The configuration of support 106 may further form a channel between support 106 and surface 102 that, during rain, allows water to flow down the rear of the device 100, draining water away from compartment 180.

Figure 4:
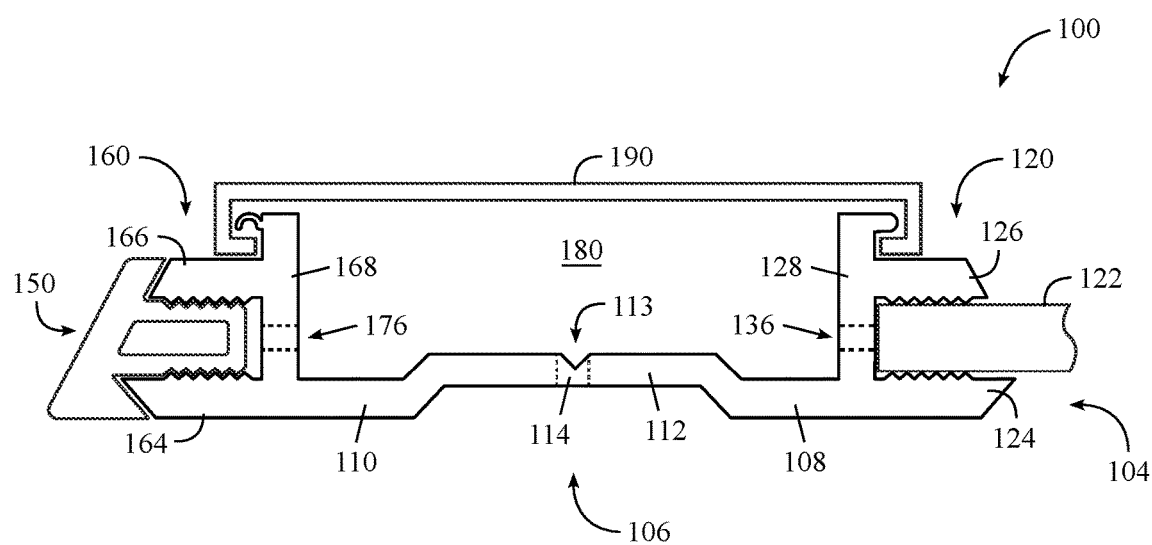
FIG. 4 shows an end view of the device of FIG. 1 fitted with a stopper.
Figure 5:
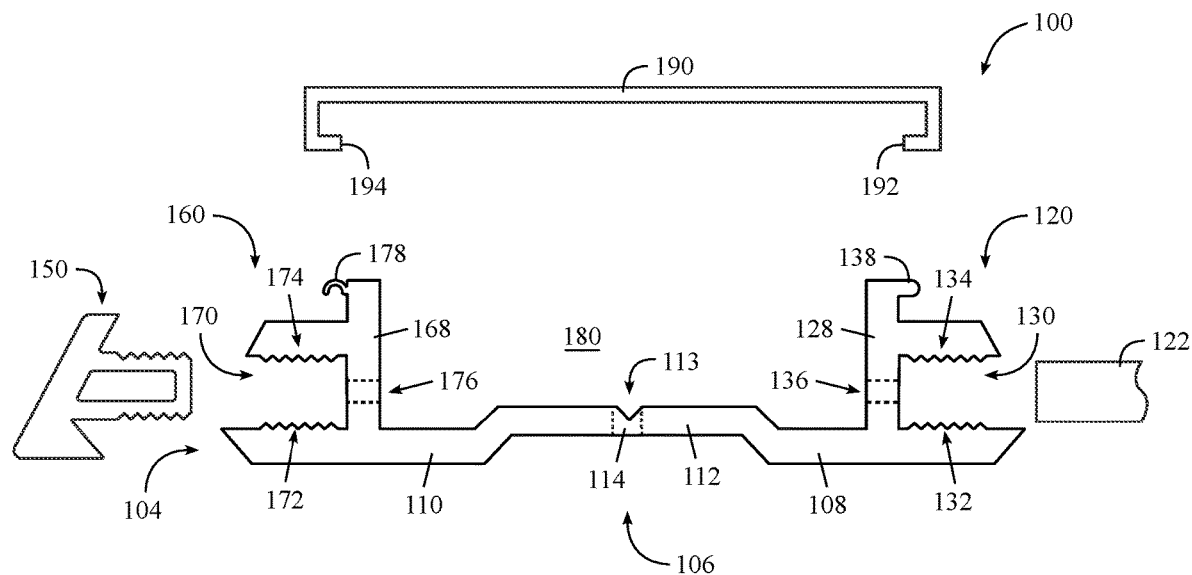
FIG. 5 shows an exploded view of FIG. 4.

Referring to FIGS. 4 and 5, device 100 is fitted with a stopper or plug 150 for blocking or sealing channel 170 of retainer 160 (although it is to be understood that stopper 150 could alternatively block channel 130 of retainer 120) when retainer 160 is not used to hold solar panel 162. Stopper 150 is removably inserted into channel 170 and is shaped to securely fit inside channel 170. In some examples, Stopper 150 provides a watertight closure of channel 170.

Figure 6:
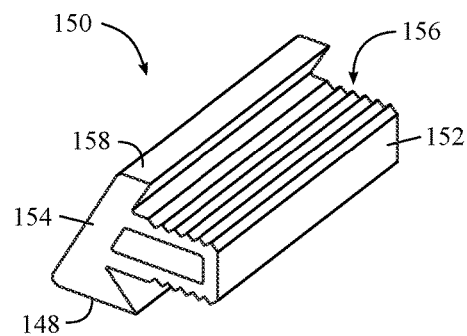
FIG. 6 shows a perspective view of an example stopper.

Referring to FIG. 6, stopper 150 comprises a stem or neck 152 and a head or cap 154 attached to an end of stem 152. Stem 152 is hollow and has a rectangular cross section, shaped and sized to match a cross section of channel 170 (or channel 130). Stem 152 comprises a resistive or abrasive portion or members 156 on opposite outer surfaces, configured to complement or cooperate with resistive portions 172 and 174 to provide a more secure fit within channel 170.

Head 154 comprises two ends 148 and 158 protruding from a central portion of head 154, giving stopper 150 a substantially T-shaped cross section. The surfaces of ends 148 and 158 adjacent to stem 152, which are configured to abut jaws 164 and 166 when stopper 150 is inserted into channel 170, are shaped to complement the shape of jaws 164 and 166.

Stopper 150 may have any length. In some examples, stopper 150 is as long as channel 170. In other examples, stopper 150 is shorter than channel 170. Stopper 150 may be made through die casting or moulding.

In other examples, device 100 comprises a single retainer (either one of retainers 120 and 160), so that it does not have an unused or empty channel when it is used for mounting a single solar panel.

Figure 7:
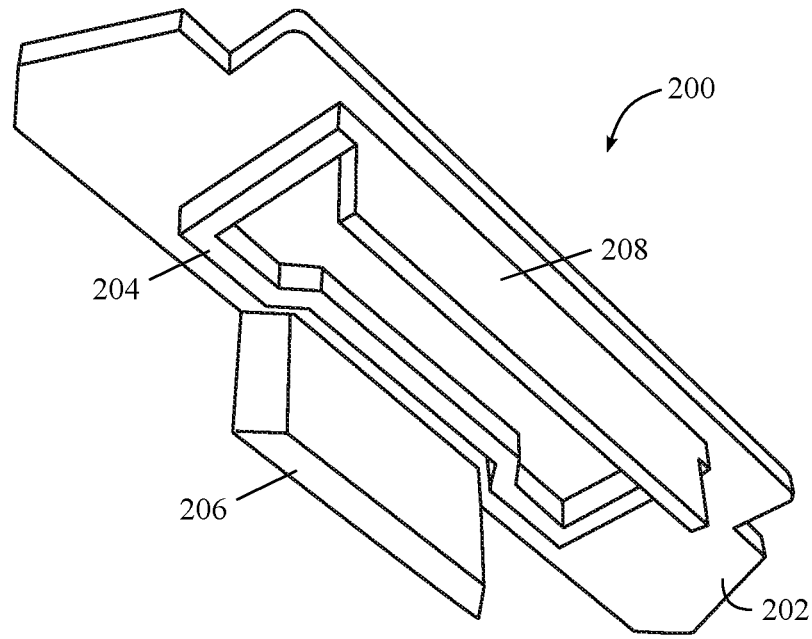
FIG. 7 shows a perspective view of an example end cover.
Figure 8:
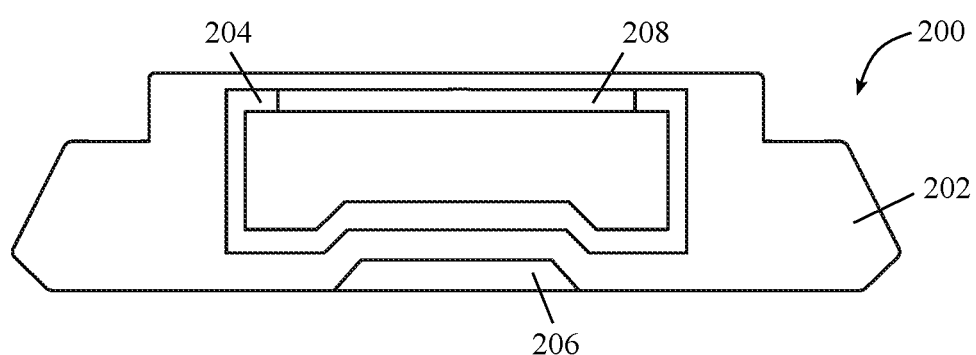
FIG. 8 shows a bottom view of the end cover of FIG. 7.
Figure 9:
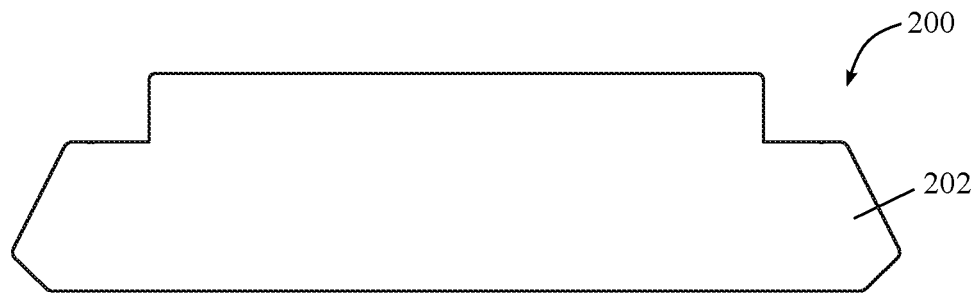
FIG. 9 shows a top view of the end cover of FIG. 7.
Figure 10:
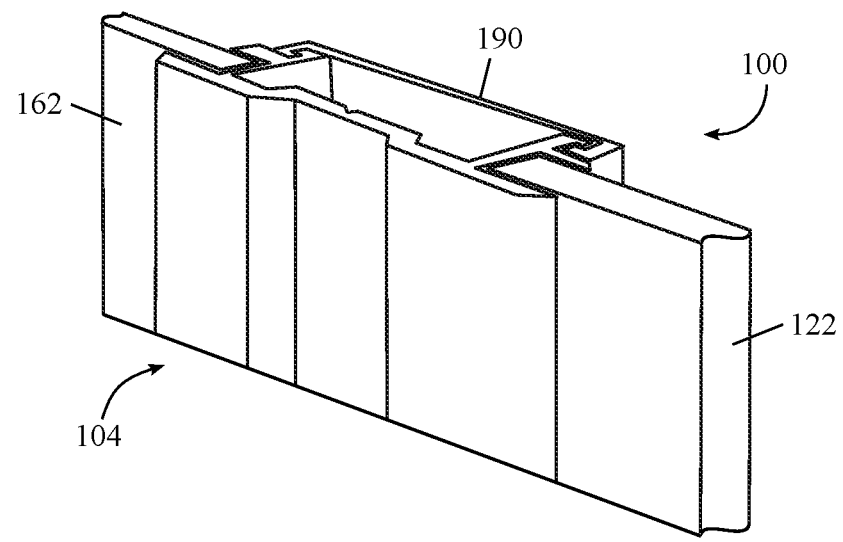
FIG. 10 shows a perspective view of the device of FIG. 1 and the end cover of FIG. 7 in an open position.
Figure 11:
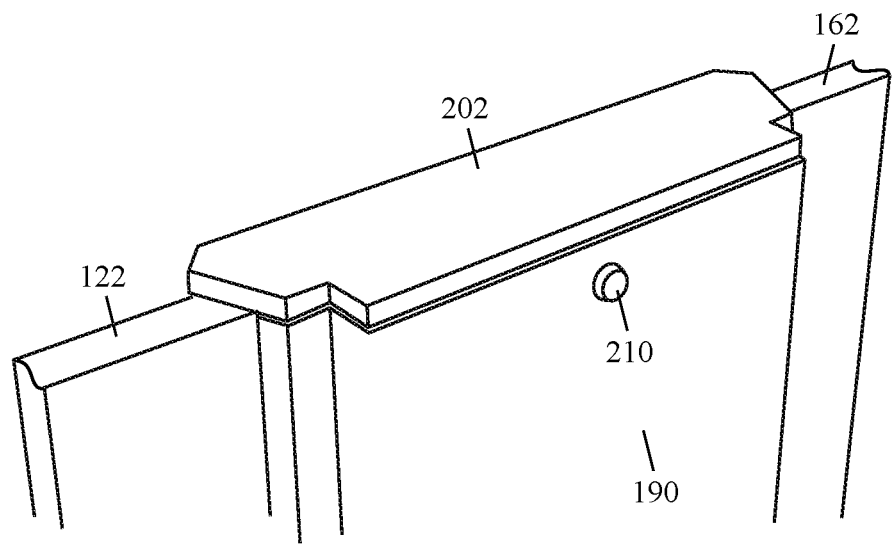
FIG. 11 shows a perspective view of the device of FIG. 1 and the end cover of FIG. 7 in a closed position.

FIGS. 7 to 9 show an example end or second cover or lid 200 of device 100 securable to frame 104 for closing an end side, such as a top end or a bottom end, of compartment 180.

Cover 200 comprises a plate or base 202 shaped to block or cover a whole end opening of compartment 180 defined between frame 104 and cover 190. Cover 200 further comprises a ridge or raised portion 204 attached to plate 202 and protruding from a main surface of plate 202. Ridge 204 is shaped to conform to at least part of a contour defined by wall 128, wall 168, support 106, and cover 190 (when cover 190 is in a closed position), so as to mate with an opening defined by these members. Cover 200 further comprises a first tab or male portion 206 and a second tab or male portion 208. Tabs 206 and 208 project from the main surface of plate 202 and are oriented so that their main surfaces are parallel to each other. Tab 206 is located at a first end of plate 202, and tab 208 is located in proximity to a second end of plate 202, opposite the first end, so that tabs 206 and 208 are spaced apart.

Referring to FIGS. 10 to 13, in a closed position of cover 200, tabs 206 and 208 are configured to mate with or be received within openings of device 100. Tab 206 has the same shape as the recess formed in support 106 (i.e. a trapezoidal prism), so that, when cover 200 is in the closed position, tab 206 mates with or fits into a slot defined between support 106 and surface 102 when frame 104 is secured to surface 102. Tab 208 has the shape of a rectangular prism and comprises a surface configured to abut or join an inward-facing or compartment-facing surface of cover 190 when covers 190 and 200 are in their respective closed positions. Therefore, when cover 200 is in the closed position, tab 208 is located inside compartment 180. Fastener 210 is driven through cover 190 and tab 208 to fix cover 200 to cover 190. As shown in FIGS. 12 and 13, when cover 200 is secured to a top end of device 100 to close a top end of compartment 180, another cover 212, like cover 200, may be secured to a bottom end of device 100 to close a bottom end of compartment 180. Covers 200 and 212 are removable and may be configured to provide watertight closures of front and bottom ends, respectively, of compartment 180. Covers 200 and 212 may be made through die casting or moulding.

Figure 14:
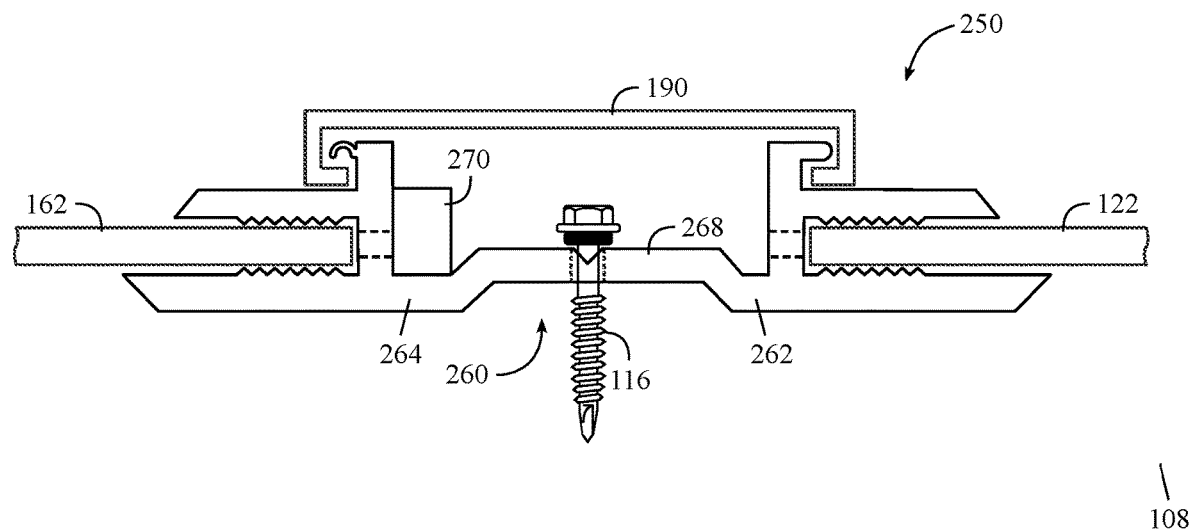
FIG. 14 shows an end view of another example device for mounting solar panels.
Figure 15:
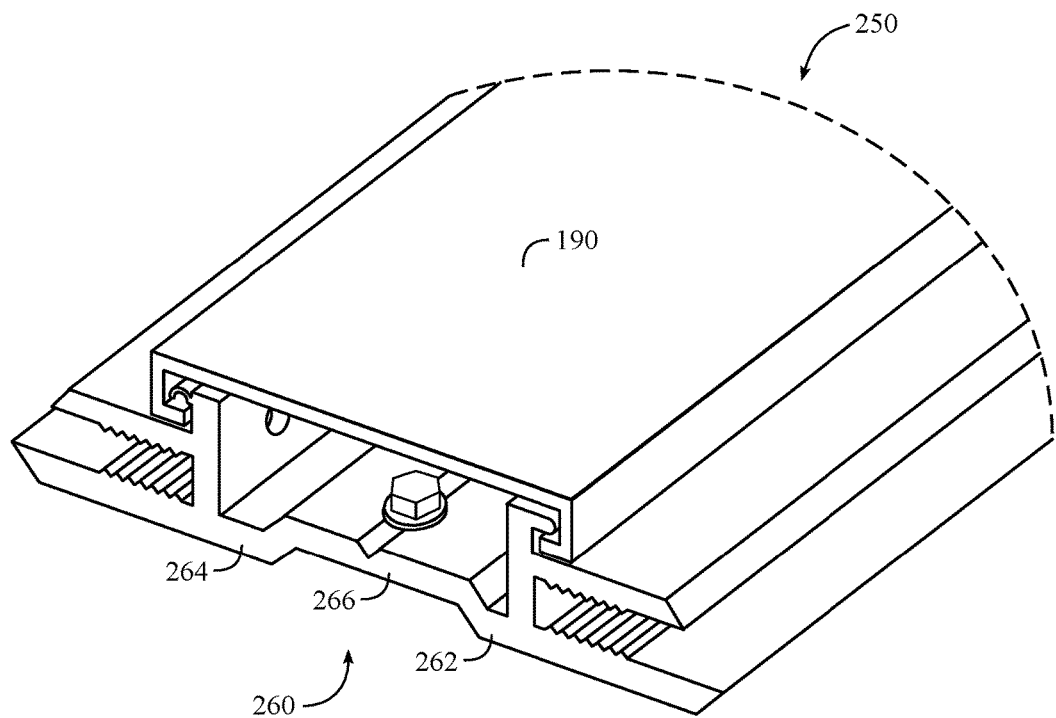
FIG. 15 shows a perspective view of the device of FIG. 14.
Figure 16:
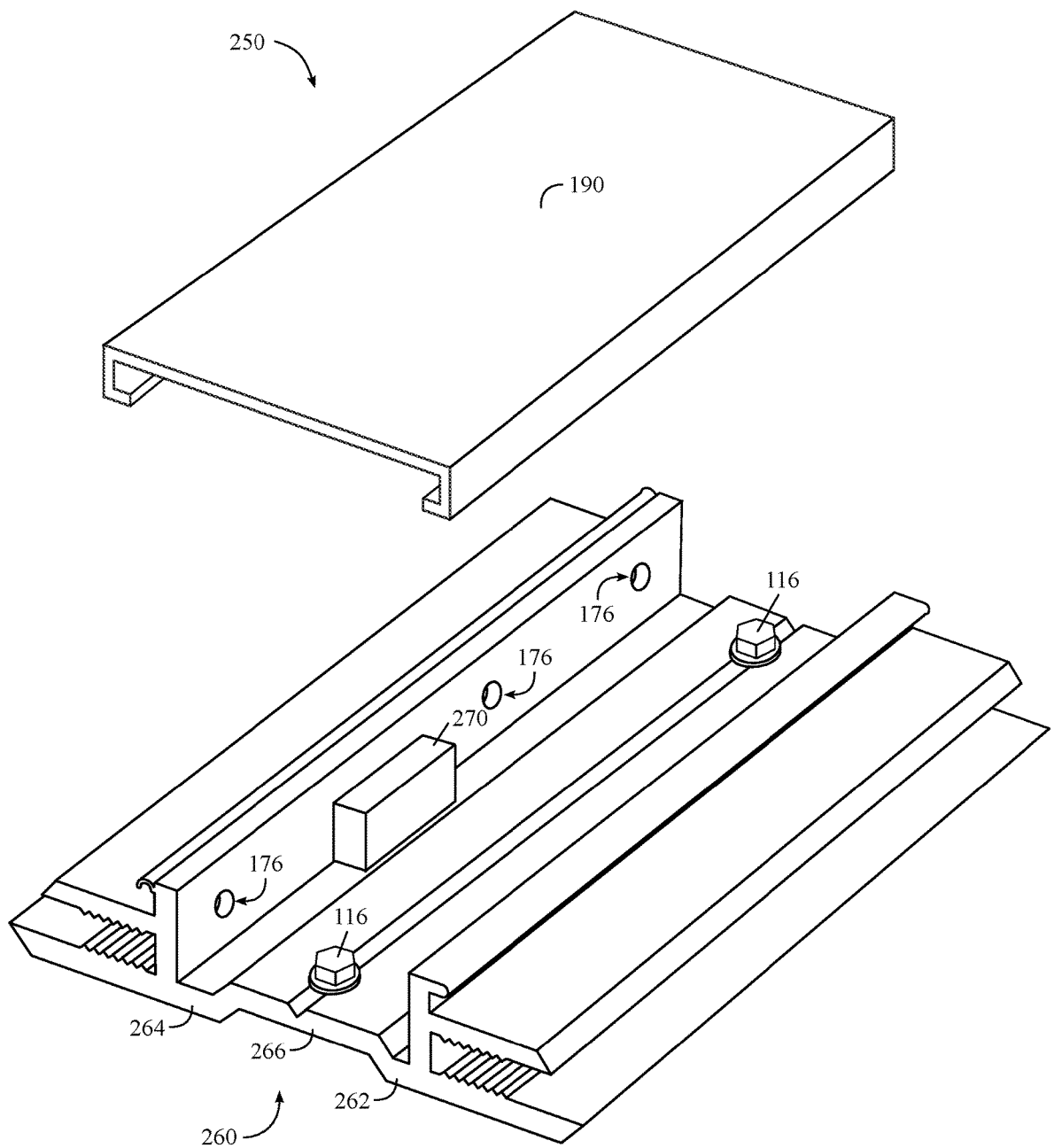
FIG. 16 shows a perspective view of the device of FIG. 14 with a front cover in an open position.

FIGS. 14 to 16 show another example device 250 for mounting solar panels. Device 250 differs from device 100 in that it has a support 260 comprising two uneven or unequally sized flanges 262 and 264, flange 264 being wider than flange 262. Support 260 therefore, unlike support 106, is asymmetrical about a plane bisecting bridge 266 between flanges 262 and 264. The larger surface area provided by flange 264 allows it to store larger equipment 270 than may be stored on flange 262.

FIG. 17 shows a flowchart of an example method 300 for mounting solar panels to a surface, which may be a vertical surface.

Steps 310 and 320 of method 300 comprise providing a first device and a second device, respectively, for mounting a solar panel to the surface. The first and second devices may be any of the devices described herein, such as device 100 or device 250.

Step 330 of method 300 comprises securing the first device to the surface, such as surface 102.

Step 340 of method 300 comprises inserting a first edge of the solar panel into a channel of the first device.

Step 350 of method 300 comprises inserting a second edge of the solar panel, opposite to the first edge, into a channel of the second device.

Step 360 of method 300 comprises securing the second device to the surface.

The solar panel is therefore mounted using two devices as described herein, which cooperate in supporting the same solar panel on the surface. The first and second device may be secured to the surface alongside and parallel to each other, separated by a distance substantially corresponding to the width of the solar panel.

In some examples, method 300 further comprises inserting two stoppers into the channel of the first device at or against two opposite ends of the first edge of the solar panel, and inserting two stoppers into the channel of the second device at or against two opposite ends of the second edge of the solar panel. The solar panel is thus held in place within each channel between two stoppers. The stoppers assist in supporting and restraining the solar panel within the channels of the first and second devices.

Optional embodiments may also be said to broadly include the parts, elements, steps and/or features referred to or indicated herein, individually or in any combination of two or more of the parts, elements, steps and/or features, and where specific integers are mentioned which have known equivalents in the art to which the invention relates, such known equivalents are deemed to be incorporated herein as if individually set forth.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

RELATED APPLICATION

The specification of Australian provisional patent application number 2023902503, filed on 8 Aug. 2023, is incorporated by reference herein in its entirety.

The invention claimed is:

1. A device for mounting solar panels to a surface, the device comprising a frame configured to be secured to the surface, the frame comprising:
   a support configured to be secured to the surface;
   a wall rising from the support; and
   a retainer comprising a first jaw and a second jaw extending from the wall, the first jaw and the second jaw defining a channel between them for receiving a solar panel,
   wherein:
      the first jaw adjoins the surface when the frame is secured to the surface;
      the first jaw is an extremity of the frame on a rear side of the frame, the rear side being the side of the frame facing the surface when the frame is secured to the surface;
      the first jaw is level with at least a portion of the support at a base of the wall; and
      the support comprises a recess on a side of the support that faces the surface when the frame is secured to the surface.

2. The device of claim 1, wherein the support comprises a first flange, a second flange, and a bridge attached between the first flange and the second flange, wherein the recess is defined by the first flange, the second flange, and the bridge.

3. The device of claim 1, wherein the wall is a first wall, and wherein the frame further comprises a second wall extending alongside the first wall and a compartment between the first wall and the second wall.

4. The device of claim 3, wherein the first wall comprises one or more apertures opening into the compartment for the passage of electrical conductors.

5. The device of claim 3, further comprising a front cover configured to be secured to the frame for closing a front side of the compartment.

6. The device of claim 5, wherein the first wall and the second wall each comprise a ledge extending from a free end of the respective first wall and second wall, and wherein in a closed position the front cover is secured to the frame by engaging the ledge of the first wall and the ledge of the second wall.

7. The device of claim 6, wherein the front cover comprises a first catch portion and a second catch portion on opposite sides of the front cover, wherein the first catch portion and the second catch portion each comprise a groove configured to receive the ledge of the first wall and the ledge of the second wall, respectively, when the front cover is in the closed position.

8. The device of claim 7, wherein the ledge of one of the first wall and the second wall is a straight ledge, and wherein the ledge of the other of the first wall and the second wall is a hooked ledge.

9. The device of claim 3, further comprising an end cover configured to be secured to the frame for closing an end side of the compartment.

10. The device of claim 3, wherein the frame comprises a further retainer comprising a first jaw and a second jaw extending from the second wall and defining a further channel between them for receiving a further solar panel, wherein the first jaw of the further retainer adjoins the surface when the frame is secured to the surface.

11. The device of claim 1, further comprising a stopper configured to be securely fitted into the channel.

12. The device of claim 11, wherein the stopper comprises a stem and a head attached to an end of the stem.

13. The device of claim 12, wherein the stem is hollow.

14. A method for mounting a solar panel to a surface using a plurality of devices according to claim 1, the method comprising:
   providing a first device according to claim 1;
   providing a second device according to claim 1;
   securing the first device to the surface;
   inserting a first edge of the solar panel into the channel of the first device;
   inserting a second edge of the solar panel into the channel of the second device; and
   securing the second device to the surface.

15. The method of claim 14, further comprising inserting two stoppers into the channel of the first device at both ends of the first edge of the solar panel, and inserting two stoppers into the channel of the second device at both ends of the second edge of the solar panel.

16. The method of claim 14, wherein the surface is a vertical surface.

* * * * *